252-101

Patented June 2, 1953 2,640,763

UNITED STATES PATENT OFFICE 2,640,763

ETCHING

John A. Easley and Harry E. Swayze, Midland, Mich., assignors to The Dow Chemical Company, Midland, Mich., a corporation of Delaware No Drawing. Application February 12, 1951, Serial No. 210,614

15 Claims. (Cl. 41—42)

The invention relates to a method of etching metal. It more particularly concerns an improved method of producing a relief in the surface of an object of an acid-soluble metal, as in making a printing plate by etching with an acid solution.

In the conventional method of making a metal printing surface, as in making a photoengraving of an acid-soluble metal such as magnesium, zinc, and their alloys, a light sensitive coating or "enamel" is applied to the metal surface which is usually flat or cylindrical. The coated surface is exposed to light through a negative having an image therein so as to produce a corresponding image in the coating. The exposed coated surface is "developed" forming an acid resistant coating in the form of the image produced by the exposure. The acid resistant coating, which is referred to as a resist, is usually further hardened as by a hardening treatment which increases its resistance to the etching acid. The surface of the metal bearing the so-prepared resist is then subjected to etching by an acid.

The etching is usually carried out with nitric acid suitably diluted with water, the acid solution being usually splashed or otherwise impinged against the object. The acid solution attacks the bare portions of the metal, that is, the portions of the object denuded of the light sensitive material in the developing operation. The rest of the metal surface is protected by the resist from direct attack by the acid which does not penetrate the resist. As the etching proceeds, metal from the bare portions of the object dissolves away leaving the adjacent image in vertical relief. As soon as a moderate depth of etch is made in this way, attack by the acid in a lateral direction on the metal supporting the acid-resisting image becomes noticeable and the resist may be undercut slightly around its edges. Before a significant amount of the metal forming the relief is dissolved away by lateral attack, the etching solution is rinsed off, the rinsed object is dried, and the dried object is then treated to protect the metal relief from lateral attack by the acid when the object is subjected to further etching. One method of providing this protection is to powder the object in each of four directions, i. e. N. S. E. and W., with an acid-resisting powdered material called "etching powder" so as to coat with the powder all sides of the portions of the metal in relief. After each powdering, the powder is "burned in," that is, the powdered etched object is heated to fuse and fix the acid-resisting material in place as an acid resistant coating. The object thus protected by powdering or otherwise is then given a second etch. This etch increases the depth of the prior etch without attack on the metal already in relief, the sides of which are protected from the acid.

The second etch, like the first, is stopped before a significant amount of attack is produced on the sides of the relief below the protected portion, and, as before, the etched object is again rinsed, dried, and given a protective treatment as by powdering so as to form an acid-resisting coating on all sides of the newly formed portion of the relief. The object is then ready for a third etch which is carried out in a manner similar to the preceding etches. The object is thus alternately subjected to etching, protecting of the relief, and etching so as to accentuate the relief while restraining attack by the acid on the image-supporting metal in relief, until a sufficient depth of etch is produced in the surface of the object not coated with resist to meet printing requirements. The number of etches made by the acid or "bites," as these etches are called in the trade, is usually three, four, or five depending upon the character of the image and the depth of etch required. The foregoing steps are well-known in the art and are practiced in various ways best adapted to the work in hand.

Although the acid etches away the metal rapidly, the time taken for the entire operation of completing the preparation of the relief or printing surface for example, when several bites are to be made, is inordinately large. This is due mainly to the numerous time-consuming steps of rinsing, drying, and protecting the relief which are required between each bite of the etcher to prevent undercutting the image while obtaining a sufficient depth of etch for the purpose in hand and are more time-consuming than the etching operation itself.

It is the principal object of the invention to provide a method of preparation of a metal relief by etching with acid, as in the preparation of a printing surface, which may be carried out with dispatch. Another object of the invention is to reduce or prevent the attack of the acid on the metal in relief under an acid resist and thereby reduce or eliminate the need for interposing one or more protective treatments, e. g. powdering and burning in, to save the relief from lateral attack as it forms during etching. Other objects and advantages will become apparent during the description of the invention.

The invention is predicated upon the discovery that by including in the acid etching bath, and impinging the bath composition against the object to be etched, certain agents which produce a removable acid resistant film that exerts a controlling effect on the dissolving action of the acid, the dissolving action of the acid normal to the surface of the work is not adversely affected while the dissolving action laterally, that is, in a direction which tends to dissolve away metal in relief and undercut the resist, is substantially reduced. As a result, there is obtained a deeper etch without significant loss in area of surface in relief and one or more, if not all, protective treatments, applied after the relief forms to prevent lateral etching of the relief, may be eliminated. The elimination of more or less, if not all the protective treatments, results in faster production of a finished etched object and substantial savings in both labor and materials.

In connection with evaluating the effects of the agents added to the acid etching bath according to the invention for controlling the etching action of the acid, the term "etch factor" is used. This term is defined as the ratio of the depth of the etch adjacent to a line of resist to one-half the loss in width of metal at the top of the surface of the relief beneath the line of resist. The etch factor affords a measure of the amount of attack by the acid laterally (i. e. parallel to the surface bearing the relief) compared to the amount of attack downwardly (i. e. normal to the surface bearing the relief). The etch factor varies to some extent with the area of the bare metal exposed to the etcher as well as the depth of etch. For purposes of making comparative tests, these variations may be ignored if the bare metal surface adjacent to the resist is at least 0.02 inch wide and the etch is carried to a depth of at least 0.005 inch in each test.

In tests of nitric acid solutions containing from 1 to 50 per cent of $HNO_3$ in water by weight, the etch factors observed range from about 1.5 to about 7 using a magnesium-base alloy plate having a nominal composition of 3 per cent aluminum, 1 per cent zinc, 0.2 per cent manganese, the balance being magnesium and strongly impinging the acid solution against the plate, as by means of an air stream or splashing, until etched to a depth of about 0.010 inch.

By the present invention, the etch factor of the nitric acid etching bath is substantially increased, thereby making it possible to reduce, as already mentioned, the overall time required to produce the desired depth of relief in the metal surface.

In carrying out the invention, nitric acid diluted with water to a suitable concentration is used. It is generally not desirable to greatly dilute the acid as this reduces its rate of action on the metal. On the other hand, if insufficient dilution is employed, the action of the acid may be too severe and the resist may be injured, as when the concentration exceeds about 50 per cent of $HNO_3$ by weight. Concentrations in the range of 3 to 20 per cent $HNO_3$ are generally most useful. A preferred range of concentrations is 5 to 10 per cent, while a concentration of 7 per cent of $HNO_3$ by weight is generally satisfactory.

In accordance with the invention, there is added to the suitably diluted (with water) nitric acid solution an agent which increases the etch factor. Agents suitable for the purpose are the relatively insoluble saturated aliphatic acids that are either normally liquid or become liquid at moderately elevated temperatures, such as those having from 5 to 26 carbon atoms, i. e. valeric acid to cerotic acid in the homologous series of saturated aliphatic acids. Effective amounts of the saturated aliphatic acid to use depend upon the concentration of $HNO_3$ in the aqueous nitric acid solution. In general, as the concentration of $HNO_3$ in the nitric acid solution is increased, the amount of saturated aliphatic acid used is to be more or less correspondingly increased. Excessive amounts of the aliphatic acid interfere with the etching action of the nitric acid while too small amounts fail to produce an increase in etch factor. Amounts between these extremes are used. As a quantitative illustration, there may be used from about 0.05 to 4 times as much saturated aliphatic acid as there is $HNO_3$ in the aqueous nitric acid solution.

The following examples are illustrative of the invention:

*Example 1*

A plate formed of a magnesium-base alloy having a nominal composition of 3 per cent of aluminum, 1 per cent of zinc, and 0.2 per cent of manganese, the balance being magnesium is coated with a conventional light sensitive enamel in the usual way and then exposed through a photographic negative having a series of parallel alternating opaque and transparent lines, the widths of the transparent lines being at least 0.12 inch. After the exposure, the plate is developed leaving a series of parallel lines of resist corresponding to the transparent lines of the negative with spaces of bare metal at least 0.12 inch wide between each line of resist.

An etching bath is made by mixing a dilute nitric acid and lauric acid in the following proportions:

| | Parts by weight |
|---|---|
| 10% $HNO_3$ solution | 98 |
| Lauric acid | 2 |

The mixture is heated to 65° C. It forms two liquid phases and is maintained in a state of agitation by stirring while being impinged upon the plate to be etched, as by an atomizing nozzle using about 30 pounds per square inch air pressure. After 30 seconds, the impingement is stopped and the plate is rinsed and dried.

The bare metal portions of the plate are found to be etched to a depth of 0.038 inch while the width of the lines of the resist has decreased but slightly producing an etch factor of about 64.

The same concentration of nitric acid alone similarly used produces an etch factor of about 6 when the etching depth reaches about 0.038 inch.

*Example 2*

An etching bath is made having the following formulation:

| | Parts by weight |
|---|---|
| 7% $HNO_3$ solution | 99.1 |
| Palmitic acid | 0.9 |

A plate similar to that of Example 1 and bearing a similar resist is etched with the formulation, while it is agitated, in similar manner at about 90° C. for 30 seconds. The plate is then rinsed and dried. It is found to be etched to a depth of 0.057 inch with an etch factor of about 41.

The same concentration of nitric acid alone similarly used produces an etch factor of about 5.

*Example 3*

An etching bath is made having the following formulation:

| | Parts by weight |
|---|---|
| 7% $HNO_3$ solution | 98 |
| Stearic acid | 2 |

A plate similar to that of Example 1 and bearing a similar resist is etched with the formulation, while it is agitated, in similar manner for 20 seconds at about 90° C., rinsed and dried. It is found to be etched to a depth of 0.038 inch. The etch factor obtained is about 21.

*Example 4*

An etching bath is made having the following formulation:

| | Parts by weight |
|---|---|
| 8% $HNO_3$ solution | 91 |
| Caprylic acid | 9 |

A plate similar to that of Example 1 and bearing a similar resist is etched with the formulation, while it is agitated, in similar manner for about 30 seconds at room temperature, rinsed, and dried. The depth of etch produced is about 0.025 inch and the etch factor obtained is about 10. Nitric acid alone diluted to 8 per cent $HNO_3$ similarly used produces an etch factor of about 4.5.

*Example 5*

An etching bath is made having the following formulation:

| | Parts by weight |
|---|---|
| 8% $HNO_3$ solution | 85 |
| Valeric acid | 15 |

The mixture is heated to 90° C., thereby dissolving the valeric acid. A plate similar to Example 1 and bearing a similar resist is etched with the formulation, while it is agitated, in similar manner for about 10 seconds at 90° C., rinsed, and dried. The plate is observed to be etched to a depth of 0.033 inch. The etch factor obtained is about 15.

Although the examples specifically disclose impinging against the plate to be etched the etching bath mixture, by means of air atomization, as through an atomizing nozzle, while the etching bath is subjected to agitation, it is to be understood that other ways and means of impinging the etching bath mixture against the work to be etched may be used, such as the splash method known in the art. In the usual splash method of impinging the etching acid upon the work to be etched a series of paddles beating the surface of the bath of acid splashes the acid against the work which is held above the bath in a position to receive the splash. The etching acid after being splashed against the work drops back into the bath or against the paddles and is thus repeatedly flung at the work to be etched. At the same time, by means of the paddles, the etching bath is constantly agitated which operation ensures uniformity of admixture of the various components of the etching bath. Such mixing is desirable in the operation of the present method when the liquids involved are employed at temperatures at which miscibility is incomplete and more than one liquid phase is present in the etcher.

The following tabulation sets forth the preferred ratio of the amount of aliphatic acid to the amount of $HNO_3$ in the etching bath for the particular aliphatic acids of the examples:

| Aliphatic Acid | Range of Ratio of Aliphatic Acid Weight to $HNO_3$ Weight |
|---|---|
| lauric | 0.05 to 0.75. |
| palmitic | 0.05 to 0.75. |
| stearic | 0.05 to 0.75. |
| caprylic | 0.65 to 3. |
| valeric | 1 to 4. |

We claim:

1. An etching bath comprising a mixture of a saturated aliphatic acid having from 5 to 26 carbon atoms and an aqueous solution containing nitric acid, the hydroxyl portion of said aliphatic acid being only in the carboxylic grouping.

2. An etching bath comprising a mixture of a saturated aliphatic acid having from 5 to 26 carbon atoms and an aqueous solution of nitric acid containing 3 to 50 per cent of $HNO_3$ by weight, the amount of the said saturated aliphatic acid being from 0.05 to 4 times that of the $HNO_3$, the hydroxyl portion of said aliphatic acid being only in the carboxylic grouping.

3. An etching bath according to claim 2 in which the saturated aliphatic acid is lauric acid.

4. An etching bath according to claim 2 in which the saturated aliphatic acid is palmitic acid.

5. An etching bath according to claim 2 in which the saturated aliphatic acid is stearic acid.

6. An etching bath according to claim 2 in which the saturated aliphatic acid is caprylic acid.

7. An etching bath according to claim 2 in which the saturated aliphatic acid is valeric acid.

8. In a method of etching an object of a magnesium-base alloy having portions of its surface masked with an acid resistant coating, the step which consists in impinging upon the surface of the object so as to contact both the masked and unmasked portions thereof an aqueous solution containing nitric acid having in admixture therewith a saturated aliphatic acid having from 5 to 26 carbon atoms, the hydroxyl portion of said aliphatic acid being only in the carboxylic grouping.

9. In a method of etching an object of a magnesium-base alloy having a portion of its surface masked with an acid resistant coating, the step which consists in impinging upon the surface of the object so as to contact both the masked and unmasked portions thereof an aqueous solution containing nitric acid having in admixture therewith a saturated aliphatic acid having from 5 to 26 carbon atoms and the hydroxyl portion of said aliphatic acid being only in the carboxylic grouping, said aqueous solution containing from 1 to 50 per cent by weight of $HNO_3$ and the aliphatic acid comprising from 0.05 to 0.75 times the weight of $HNO_3$ in the nitric acid solution, the said impinging being carried out at a temperature sufficient to liquefy the aliphatic acid.

10. A method according to claim 9 in which the saturated aliphatic acid is lauric acid and its weight is from 0.05 to 0.75 times that of the $HNO_3$ in the solution.

11. A method according to claim 9 in which the saturated aliphatic acid is palmitic acid and its weight is from 0.05 to 0.75 times that of the $HNO_3$ in the solution.

12. A method according to claim 9 in which the saturated aliphatic acid is stearic acid and its weight is from 0.05 to 0.75 times that of the $HNO_3$ in the solution.

13. A method according to claim 9 in which the saturated aliphatic acid is caprylic acid and its weight is from 0.65 to 3 times that of the $HNO_3$ in the solution.

14. A method according to claim 9 in which the saturated aliphatic acid is valeric acid and its weight is from 1 to 4 times that of the $HNO_3$ in the solution.

15. In a method of etching an object of a magnesium-base alloy having a portion of its surface masked with an acid resistant coating, the steps which consist in mixing together an aqueous solution containing from 3 to 20 per cent of $HNO_3$ and a saturated aliphatic acid containing from 5 to 26 carbon atoms and the hydroxyl portion of said aliphatic acid being only in the carboxylic grouping, the mixing being carried out at a temperature at which the said aliphatic acid is liquid, the said aliphatic acid comprising from 0.05 to 4 times the weight of $HNO_3$ in the said aqueous solution, impinging a portion of the mixture while at the said temperature against the object so as to contact both the masked and unmasked portion thereof and etch the unmasked portion to the desired depth, and agitating the remaining portion of the mixture during the impingement, the said impinging being carried out at a temperature sufficient to liquefy the aliphatic acid.

JOHN A. EASLEY.
HARRY E. SWAYZE.

References Cited in the file of this patent

UNITED STATES PATENTS

| Number | Name | Date |
|---|---|---|
| 1,994,500 | Boller | Mar. 19, 1935 |
| 2,287,050 | Miller | June 23, 1942 |
| 2,374,070 | Barensfield | Apr. 17, 1945 |